United States Patent Office 3,801,706
Patented Apr. 2, 1974

3,801,706
PREPARATION OF SODIUM PERCARBONATE
Milton Sack, Syracuse, N.Y., assignor to Allied
Chemical Corporation, New York, N.Y.
No Drawing. Filed Apr. 21, 1971, Ser. No. 136,180
Int. Cl. C01d 7/00
U.S. Cl. 423—421                                    10 Claims

ABSTRACT OF THE DISCLOSURE

A process for the manufacture of sodium percarbonate comprising the steps of mixing an aqueous solution of sodium carbonate with approximately the stoichiometric quantity of an aqueous solution of hydrogen peroxide, said solutions being of a sufficiently high concentration to insure the precipitation of at least part of the thereby produced sodium percarbonate; vigorously agitating the aqueous sodium percarbonate slurry so produced, and feeding said slurry to a spray dryer in an essentially homogeneous state, thereby producing a dry, free-flowing sodium percarbonate product.

BACKGROUND OF THE INVENTION

Field of the invention

This invention relates to a method of preparing sodium percarbonate by the spray drying of a slurry containing sodium percarbonate, hydrogen peroxide and sodium carbonate.

The "percarbonates" of commerce are actually carbonate peroxyhydrates rather than true peroxycarbonates. Various peroxyhydrates of sodium carbonate have been described, such as $Na_2CO_3 \cdot 1\frac{1}{2}H_2O_2$, $Na_2CO_3 \cdot H_2O_2 \cdot H_2O$, $Na_2CO_3 \cdot 2H_2O_2 \cdot H_2O$, and several more. It is well known that these various products and several similar ones can be made by the interaction of sodium carbonate and aqueous hydrogen peroxide solutions, followed by evaporation of the solution, or by crystallization of the desired product from the solution.

The sodium carbonate peroxyhydrate or "sodium percarbonate" of commerce ($Na_2CO_3 \cdot 1\frac{1}{2}H_2O_2$), is a white, free-flowing crystalline solid. It is essentially an addition product of hydrogen peroxide and sodium carbonate and the properties of the solution resulting from dissolving said solid in water are substantially the same as those of a corresponding composition made up of sodium carbonate and aqueous hydrogen peroxide. The active oxygen content of the "sodium percarbonate" of commerce is about 14% by weight.

Sodium carbonate peroxyhydrate, which will hereinafter be referred to by the common name of the commercial product "sodium percarbonate," is used in soap and detergent formulations for home laundering and in various special-purpose cleaners. It is also used in formulated denture cleaners.

Description of the prior art

In the past, several different methods have been used and proposed for the manufacture of sodium percarbonate. One of these methods involves the reaction between hydrogen peroxide and sodium carbonate in the presence of a limited amount of water so that the sodium percarbonate is obtained directly. This method, however, is penalized by a substantial loss of oxygen in the mother liquor, so that low yields (about 70% of theory) are obtained based on the available oxygen in the hydrogen peroxide charge. In another method hydrogen peroxide and sodium carbonate react in an aqueous solution to form the sodium percarbonate in solution which is then salted out of solution by the addition of sodium chloride. If hydrogen peroxide and sodium carbonate are added simultaneously to the mother liquor from a previous precipitation, the process becomes cyclic. This method is capable of giving improved, although still poor oxygen efficiencies, e.g. 85% (13% available oxygen). What is meant by "oxygen efficiency" is the ratio between the percent of available oxygen or of hydrogen peroxide in the sodium percarbonate product, and the percent that theoretically should be present in the addition compound $Na_2CO_3 \cdot 1\frac{1}{2}H_2O_2$, which is 32.5% for $H_2O_2$ and 15.3% for the available oxygen. Thus, 27.6% $H_2O_2$ in the product represents an "oxygen efficiency" of 27.6/32.5 × 100 or 85%. This figures does not take into account the quantity of product obtained; hence, it is quite different from percent yield. The yield in terms of available oxygen is the ratio between the hydrogen peroxide (or available oxygen) in the charge, and that which can be accounted for in the final product. The bulk density of sodium percarbonate prepared in the manner last cited, is considerably greater than the 15 to 25 lbs./cu. ft. range generally required of the commercial product. In order to obtain a sodium percarbonate with the required low bulk density using the aforementioned process, it is necessary for the precipitation to take place under carefully controlled conditions in order that a fine precipitate may be obtained. The fine precipitate is extremely difficult to filter and dry, and consequently, low yields of available oxygen (about 60%) are obtained. It is thus possible to obtain bulk densities in the preferred range by the previous chemical precipitation method, but the associated low yields greatly increase the cost of the final product. In still another process disclosed in U.S. Pat. 1,950,320, high yields based on the available oxygen are claimed. In this method an aqueous hydrogen peroxide solution acts upon a solid starting material such as anhydrous sodium carbonate. The quantity of hydrogen peroxide is limited to such an extent that "a moist mixture is not even temporarily produced." The essentially dry product obtained is further dried by any one of the conventional methods. Although the examples given indicate very high yields based on the hydrogen peroxide charge, the yields are not substantiated by the figures. Furthermore, in the examples illustrating the formation of sodium percarbonate, the quantity of available oxygen present in the product is found to be in the order of 11% rather than the 14% minimum which is normally required in the commercial product. A statement is made in this patent that "a compulsory condition for success is that a moist mixture should not be formed even temporarily, that is to say, on bringing the hydrogen peroxide solution and the solid substances together, there should not be any accumulation of liquid at any place which would result in hydrolytic decomposition." It will later be shown in contradiction to this statement that a product can be obtained in considerably better yield when the sodium carbonate is in complete solution and furthermore, that the stabilizers employed are more effective when added to an aqueous solution of the sodium carbonate. Judging entirely on the basis of the examples given in this disclosure, the fair conclusion is that the method would not be applicable to the preparation of a satisfactory commercial grade of sodium percarbonate.

In contrast to the conclusion drawn in this U.S. patent, namely that "a moist mixture should not be formed even temporarily . . ." is the British patent specification 722,351 wherein it is stated, "A particular feature of the invention is that when the solutions of soda ash and hydrogen peroxide are reacted and fed to the spray dryer, before crystallization occurs, a sodium percarbonate product is obtained with a bulk density of the order of 15 to 25 lbs. per cubic foot." The method disclosed in this patent "comprising mixing solutions of hydrogen peroxide and sodium carbonate, and before sodium percarbonate has crystallized from the mixture and before any substantial proportion of oxygen has been lost therefrom, feeding the mixture to a spray dryer where it is dried to yield solid sodium percarbonate." This patent specification teaches that "the time between mixing and drying must be reduced to a minimum in order to keep the loss of active oxygen from the mixing solution to a minimum." It will later be shown in contradiction to this statement that a delay of about 5 to 10 minutes between the time the aqueous $H_2O_2$ is mixed with the $Na_2CO_3$ solution and the product is spray dried, permits adequate precipitation of the product, and in the production in good yield, of a stable sodium percarbonate product high in available oxygen. The technique of spray drying the solution before crystallization occurs is particularly stressed in this disclosure (British Pat. 722,351), the statement being made that ". . . although it has been possible to obtain sodium percarbonate with a bulk density of the order of 30 lbs. per cubic foot using chemical precipitation methods, this was only achieved by sacrificing oxygen efficiency, as this was of the order of 50 to 60%."

In all of the examples given in British Pat. 722,351, the inlet temperature of the spray dryer averages 109° C. with none being given above 120° C. The outlet temperatures average 75° with none indicated to be higher than 80° C. Also, it will be noted that in two of the five examples where the inlet temperature was above average, the percent of available oxygen in the final product was low. For example, at inlet temperatures of 115° C. and 120° C., the percentage of available oxygen in the final product was reported to be 13.4% and 13.7% respectively. These figures would generally be considered too low for a satisfactory commercial grade of sodium percarbonate. Where the inlet temperatures were 110° C., 100° C. and 100° C., the percent available oxygen in the final product was given as 14.18%, 14.06% and 14.08%, respectively. These results might well be anticipated, since the patent teaches the use of a complete solution as feed to the spray dryer. This is also consistent with the teaching of U.S. Pat. 2,308,992 wherein it is stated, "Upon atomization of solutions, suspensions or fusions which besides the other constituents of the detergent, contain percompounds, the percompounds are decomposed because of the effect of the elevated temperatures required during the atomization treatment and the presence of water, thereby causing the loss of their effective bleaching ingredient, namely the active oxygen."

The prior art teaches that precipitation of the percarbonate prior to "atomizing" or spray drying the sodium percarbonate solution is conducive to product decomposition, loss of available oxygen and poor yields. Such precipitation, it is taught, even if only temporary in nature, should be avoided. We have found surprisingly, contrary to the teaching of the prior art, that a sodium percarbonate product having a higher and more acceptable level of available oxygen, a product having greater stability, and a product in good yield, can be obtained when the greater part of the sodium percarbonate present in the reaction mixture is permitted to precipitate before the slurry is spray dried. The stability of the precipitate of the present invention is so high, that we may advantageously use considerably higher temperatures in spray drying than has heretofore been considered possible. This offers a considerable advantage since it permits the use of smaller equipment, thus resulting in reduced capitalization costs.

In the present invention the maximum percent active oxygen (14.6%) and the maximum oxygen efficiency (95.4%) based upon the $H_2O_2$ content (theory 32.5%), was achieved at an average inlet temperature of 165° C. and an outlet temperature of 80° C. Highly satisfactory results were also obtained with inlet temperatures as high as 205° C.

The high yields obtained in the present invention are surprising and unexpected, since the large losses of hydrogen peroxide anticipated by the prior art did not occur at the high inlet temperatures used in spray drying the product. This surprising stability of the slurry being spray dried may be attributed to the removal of hydrogen peroxide from the reaction medium by precipitation as sodium percarbonate. It may thus be concluded that at even relatively high temperatures the rate of decomposition of sodium percarbonate in the solid phase is much less than that of the hydrogen peroxide and the sodium percarbonate in aqueous solution, and indeed, much less than the prior art would lead one to expect of the solid salt. For a sodium percarbonate product in good yield, high in available oxygen and having a high degree of stability, the amount of solid sodium percarbonate present in the slurry should preferably be essentially the maximum which will still permit efficient operation of the spray dryer. Based on the teaching of the prior art, however, this method of operation would be expected to yield a product of undesirably high bulk density. Surprisingly, this is not the case.

A significant difference between the use of 30% hydrogen peroxide as preferred by the British Pat. 722,351 previously cited, and the approximately 50% hydrogen peroxide which we prefer, is the ability of the latter, and the inability of the former, to rapidly precipitate sodium percarbonate from the reaction medium. In the British patent specification just cited, the concentration of peroxide chosen is just low enough to maintain all the sodium percarbonate in solution, while in the present invention the concentration is sufficiently high so as to yield a precipitate of sodium percarbonate consonant with the efficient operation of a spray dryer. This is an important difference since both methods attempt to achieve the same end, a reduction in the decomposition of the final product during spray drying, but each by a different approach.

To summarize, some of the advantages in spray drying a slurry containing crystals of sodium percarbonate, rather than a complete solution of sodium percarbonate, sodium carbonate, and hydrogen peroxide are:

(a) The loss of hydrogen peroxide due to decomposition is reduced, since the rate of decomposition of hydrogen peroxide chemically combined in the solid percarbonate is much less than that of $H_2O_2$ in alkaline solution, and also because the quantity of hydrogen peroxide remaining in solution is less for the slurry.

(b) The amount of water to be removed is less, thus resulting in lower production costs.

(c) The use of higher inlet temperatures permits the use of smaller equipment and reduces processing time, thus resulting in a further reduction of both operating and capitalization costs.

Since the feed to the dryer is in the form of a slurry rather than a solution, there is less water to be removed than is the case with prior art processes involving the spray drying of aqueous solutions. In the process of the present invention, the slurry in substantially a homogeneous state is generally exposed to the full heat of the spray dryer for less than a second, thus further minimizing the amount of spontaneous decomposition of the product contained therein. I attribute the fine quality of the product and the efficiency of the operation at least in part to the practice of maintaining the solid particles of precipitated sodium percarbonate in essential a homogeneous state.

SUMMARY OF THE INVENTION

An aqueous solution of sodium carbonate is prepared and then mixed with an aqueous solution of hydrogen peroxide, both solutions being sufficiently concentrated so as to form within a few minutes a precipitate of sodium percarbonate. It is highly desirable to have the slurry so produced vigorously agitated so as to maintain the slurry in an essentially homogeneous state throughout the spray drying operation. The slurry of fine, uniformly distributed crystals is then fed into a spray dryer where it is dried to yield solid, free-flowing sodium percarbonate.

PREFERRED EMBODIMENT OF THE INVENTION

According to a preferred embodiment of the present invention, a continuous process for the manufacture of sodium percarbonate comprises continuously mixing solutions of hydrogen peroxide and sodium carbonate and feeding the slurry so obtained directly to a spray dryer where it is dried to yield solid sodium percarbonate.

Preferably, the aqueous solution of $H_2O_2$ should have a concentration of at least 40%, and the sodium carbonate solution should be essentially a saturated solution at 20–25° C., to insure, on mixing the two solutions, at least partial precipitation of the sodium percarbonate thus formed. Preferably, the sodium carbonate raw material contains less than 5 parts per million of metallic contamination as iron because metal contaminants catalyze the decomposition of hydrogen peroxide and/or sodium percarbonate. Small amounts of one or more potassium percarbonate stabilizers are preferably added to the sodium carbonate solution before the mixing step with hydrogen peroxide. Well known conventional stabilizers may be employed, some of which are water-soluble magnesium salts such as the chloride, sodium silicate, combinations of both, and water-soluble tin salts such as stannous chloride. I have carried out tests on the above and my preferred stabilizer of these well-known stabilizers is a combination of magnesium added as $MgCl_2$ (anhydrous basis) in the amount of about 0.1 to 1.0% of the weight of the anhydrous sodium carbonate charge, and sodium silicate, added as a 40° Bé

$$Na_2O:SiO_2 = 1:3.25$$

solution to provide about 0.5 to 1.0% $Na_2Si_3O_7$, also based on the anhydrous sodium carbonate charge.

When any metal contamination of the sodium carbonate charge is less than about 5 p.p.m. as iron, generally the stabilizers will effectively reduce the ability of the metallic contaminants to catalytically decompose the hydrogen peroxide or the final product. However, if the metallic contamination exceeds about 5 p.p.m. as iron, an unacceptable amount of decomposition may occur even in the presence of the stabilizers.

The sodium carbonate and hydrogen peroxide are preferably mixed in the proportion of one mol of $Na_2CO_3$ to 1½ mols of $H_2O$, which ratio corresponds to that found in the sodium percarbonate product. More specifically, the sodium carbonate solution is preferably prepared in a strength of about 15% as $Na_2CO_3$. (It may be prepared as a 15.2% solution so as to adjust to a 15% solution after the addition of the stabilizers.)

The 15% sodium carbonate solution is permitted to stand, preferably with agitation, for at least 3 minutes, and preferably for a period of about 5–60 minutes after the addition of the stabilizer(s) to permit the stabilizer(s) to react with any metallic impurities that may be present. Agitating or allowing the sodium carbonate solution with stabilizer(s) added to stand for more than 60 minutes, is not particularly detrimental but serves no useful purpose. After the addition of the stabilizer(s) and the subsequent period of agitation, the so-treated solution is quickly stirred with a quantity of about 50% $H_2O_2$ representing 1½ mols of $H_2O_2$ per mol of $Na_2CO_3$. The mixture is stirred vigorously until a fairly heavy precipitate of sodium percarbonate is formed. Based on practical experience, it is desirable to allow a period of at least 3 minutes, and preferably 5 to 15 minutes to elapse between the time the hydrogen peroxide solution is mixed with the sodium carbonate solution containing the stabilizer(s), and the time the resulting slurry is spray dried. During this period in the preferred process and right up to the time the feed mixture is delivered to the spray dryer, vigorous agitation is maintained to keep the sodium percarbonate solids uniformly distributed and in an essentially homogeneous state. Allowing a lapse of over 15 minutes between mixing and spray drying is not particularly detrimental, but is generally unnecessary.

This waiting period permits at least partial precipitation of the sodium percarbonate within the mixture before spray drying, which we have found to be advantageous, for it reduces substantially the amount of decomposition sustained during the spray drying step. An additional advantage of having a waiting period between mixing and spray drying the mixture is that a quantity of feed materials may be prepared in advance and retained briefly in a surge tank to thus insure that ample feed materials are available to continuously feed the spray dryer.

The temperature of the inlet to the spray dryer is preferably kept between about 150 to 250° C., and the slurry feedrate is adjusted so as to give a satisfactory dry product having less than 1.0% moisture. The product obtained from the process of the present invention will normally have a bulk density of between about 15 and 25 lbs. per cu. ft., and contain better than 14% available oxygen (29.8% $H_2O_3$), with yields based on the $H_2O_2$ charge consistently better than 90%.

The invention is further illustrated by the following examples:

EXAMPLE 1

Run 1: 60 grams (0.57 mols) of $NaCO_3$ (anhydrous) containing about 1.0 p.p.m. $Fe^{+++}$ are dissolved in 340 grams of water, and 1.1 grams of sodium silicate solution ($Na_2O:SiO_2 = 1:3.25$  40° Bé) and 5 ml. of a 6.2% solution of $MgCl_2 \cdot 6H_2O$ are added. The mixture is then placed in an addition funnel (leading to a portable spray dryer) which is equipped with a mechanical agitator. Stirring is started and after approximately 5 minutes, 57.3 grams (0.85 mol) of 50.4% $H_2O_2$ are quickly added.

Within 5 to 10 minutes a heavy precipitate of sodium percarbonate is formed. Vigorous stirring of the slurry is maintained at all times to keep it essentially homogeneous throughout the spray drying operation. The inlet temperature of the spray dryer is adjusted to 165° C. and the outlet temperature to 80° C. before the introduction of the slurry to be spray dried. Addition of the feed slurry to the spray dryer is started 10 minutes after the hydrogen peroxide is mixed with the sodium carbonate. Residence time in the spray dryer is exceedingly short being in the order of a fraction of a second. The feed rate to the spray dryer is adjusted to a level which insures the production of a dry product entirely free of traces of moisture. Three more runs are carried out in the same manner as Run No. 1, with the exception that for Runs 2 through 4, the spray dryer temperatures are preadjusted as shown in Table I, and that in the case of Run No. 4, the iron content of the sodium carbonate used runs between 2 to 5 p.p.m. as $Fe^{+++}$. Stoichiometric quantities of $H_2O_2$ are used in all runs except No. 4 in which a 4 mol percent excess is used. Tables I and II below tabulate the data obtained in these four spray drying runs.

TABLE I.—SPRAY DRYING RUNS

| Run number | Fe p.p.m. in $Na_2CO_3$ | Average temp., ° C. Inlet | Average temp., ° C. Outlet | Product Percent $H_2O_3$ (theory 32.5) | Product Percent active oxygen | Oxygen efficiency |
|---|---|---|---|---|---|---|
| 1 | 1.0 | 165 | 80 | 31.0 | 14.6 | 95.4 |
| 2 | 1.0 | 187 | 80 | 29.9 | 14.1 | 92.0 |
| 3 | 1.0 | 205 | 85 | 29.9 | 14.1 | 92.0 |
| 4 | 2.0–5.0 | 198 | 105 | 29.2 | 13.75 | 90.0 |

TABLE II.—STABILITY OF SPRAY DRIED SODIUM PERCARBONATE

| Run number | Fe p.p.m. in Na₂CO₃ | Percent H₂O₂ | Percent active oxygen | Percent loss of original active oxygen at— | | | |
|---|---|---|---|---|---|---|---|
| | | | | Room temperature | | 50° C. | |
| | | | | 1 month | 2 months | 1 week | 1 month |
| 1 | 1.0 | 31.0 | 14.6 | 1.0 | 1.0 | 0.7 | 3.6 |
| 2 | 1.0 | 29.9 | 14.1 | 0.6 | 0.3 | 0.3 | 2.2 |
| 3 | 1.0 | 29.9 | 14.1 | 0.0 | 0.6 | 0.3 | 2.7 |
| 4 | 2.0-5.0 | 29.2 | 13.75 | 0.0 | 0.3 | 0.7 | 3.8 |

An examination of the data in Tables I and II above indicates that:

(a) Oxygen efficiencies of more than 90% can be obtained by the method of the present invention.
(b) Inlet temperatures of at least 205° C. can be safely used.
(c) Product stability exceeds the following typical commercial requirement: H₂O₂ content 29.7% min. (=active oxygen of 14.0%), less than ½% loss of original active oxygen content after 1 month at room temperature, and 5.9% after 1 month at 50° C.
(d) The Mg⁺⁺—Na₂Si₃O₇ stabilization system is very effective.

The spray dryer used in the examples reported above is a portable unit manufactured by the Nerco-Niro Spray Dryer Division of the Nichols Engineering and Research Corporation of New York, N.Y.

EXAMPLE 2

200 lbs. of anhydrous sodium carbonate containing less than 3.0 p.p.m. of iron are dissolved with agitation in 134 gallons of water at about 25° C. To the 15.2% sodium carbonate solution thus formed are added with stirring 3 lbs. 10 oz. of a 40° Bé sodium silicate solution $$(Na_2O:SiO_2=1:3.25)$$

and 2 gallons of a 6.2% solution of magnesium chloride hexahydrate, thus providing a 15% solution of sodium carbonate containing stabilizers.

Using proportioning pumps, the 15% sodium carbonate solution containing the magnesium chloride and sodium silicate additives is pumped into a 25 gallon agitated vessel at the rate of 46 gallons per hour, simultaneously with 6.6 gallons per hour of a 50% aqueous solution of hydrogen peroxide. The contents of the vessel are maintained at about 25° C. The slurry formed by the precipitation of sodium percarbonate is vigorously agitated throughout the spray drying operation in order to keep it essentially homogeneous. The level in this mixing vessel is maintained at between 8 and 10 gallons as the slurry is withdrawn by means of a precision slurry pump, at the rate of 52.6 gallons per hour, and fed into a conventional spray dryer. The flow of the solutions into the 25 gallon vessel and the flow of slurry withdrawn is carefully adjusted and balanced so as to maintain the level in the 25 gallon mixing vessel as previously indicated.

The inlet temperature of the spray dryer is maintained at about 180° C. A fine free-flowing dry product is obtained having less than 1% moisture and a bulk density of approximately 22 lbs. per cubic foot. The product assays 29.0% H₂O₂ whereas theory is 32.5%; hence, the hydrogen peroxide content and the available oxygen content (oxygen efficiency) is 92% of theory.

96.0 lbs. of dry product is discharged per hour from the spray drper. This represents an 86.8% yield based on the hydrogen peroxide used. What is meant by yield based on hydrogen peroxide is the ratio between the hydrogen peroxide charge and the hydrogen peroxide which can be accounted for in the final product. The yield based on the sodium carbonate charge is 98%.

EXAMPLE 3

This continuous run is carried out exactly the same as that of Example 2. 98.6 lbs. of dry product per hour is recovered from the spray dryer. This represents a 99% yield based on the sodium carbonate charge. The H₂O₂ assay in the product is 31.0% H₂O₂ or 14.6% as available oxygen. Since the theoretical H₂O₂ content for this addition compound is 32.5%, an oxygen efficiency of 95.4% is obtained. The H₂O₂ yield, that is, the ratio between the hydrogen peroxide charged per hour and the hydrogen peroxide in the total product per hour, is 94.9%.

In summary, the process of the present invention is unique in having in combination the following advantages over the known prior art processes: The present process permits the continuous or intermittent spray drying of a slurry containing crystals of sodium percarbonate, to thus consistently produce a satisfactory product of acceptable density in good yield containing 14.1–14.6% active oxygen. The product is surprisingly stable, exhibiting a loss of only 2.2 to 3.8% active oxygen after storage for a month at 50° C. The simplicity of the process permits it to be carried out with a minimum of labor, and the relatively high temperatures which may be tolerated in spray drying bring about a reduction in spray drying equipment and required floor space. No contaminating additives such as salt, common to several prior art processes, need be introduced, and no byproduct liquors, filtrations or liquid separations are required, all of which points combine to make the present process exceptionally economical.

It should be understood that the present invention is not limited to the procedural steps hereinbefore set out, but that it extends to all equivalents within the scope of the claims appended thereto.

What is claimed is.

1. A process for the manufacture of solid, finely divided sodium percarbonate comprising mixing an aqueous solution of hydrogen peroxide having a concentration of at least 40% and an aqueous solution of sodium carbonate which is essentially saturated at a temperature of 20–25° C. to precipitate at least a portion of sodium percarbonate, agitating the mixture of precipitate and aqueous liquid to maintain the mixture is a homogeneous state, and spray drying the homogeneous mixture to produce finely divided, solid sodium percarbonate.

2. The process of claim 1 wherein the inlet temperature of the spray dryer is maintained above about 150° C.

3. The process of claim 2 wherein the inlet temperature of the spray drying zone is maintained between about 150° C. and 250° C.

4. The process of claim 1 wherein the sodium carbonate and hydrogen peroxide are mixed substantially in the proportion of one mol of sodium carbonate to 1½ mols of hydrogen peroxide.

5. The process of claim 1 wherein inorganic stabilizers amounting to no more than 2% of the weight of the sodium carbonate charge are added to the carbonate solution.

6. The process of claim 1 wherein MgCl₂ amounting to between 0.10 to 1.0% of the weight of the sodium carbonate present in the solution is combined in that solution with Na₂Si₃O₇, amounting to between about 0.5 and 1.0% of the weight of the sodium carbonate in said solution.

7. The process of claim 5 wherein the sodium carbonate solution is agitated for at least 3 minutes, between the time that the stabilizers are added, and the sodium carbonate solution with these additives is mixed with the hydrogen peroxide.

8. The process of claim 7 wherein the sodium carbonate solution is preferably agitated for from 5 to 60 minutes, between the time that the stabilizers are added and the sodium carbonate solution with these additives is mixed with the hydrogen peroxide.

9. The process of claim 1 wherein the sodium carbonate/hydrogen peroxide mixture is agitated for at least 3 minutes between the mixing step and the spray drying of the homogeneous mixture.

10. The process of claim 9 wherein the sodium carbonate/hydrogen peroxide mixture is preferably agitated for 5 to 15 minutes between the mixing step and the spray drying of the homogeneous mixture.

References Cited

UNITED STATES PATENTS

| | | | |
|---|---|---|---|
| 2,541,733 | 2/1951 | Young | 423—421 X |
| 2,986,448 | 5/1961 | Gates et al. | 423—421 X |
| 1,950,320 | 3/1934 | Muller | 423—421 |
| 2,308,992 | 1/1943 | Mertens | 252—97 |

FOREIGN PATENTS

| | | |
|---|---|---|
| 152,366 | 10/1920 | England. |
| 549,841 | 12/1942 | England. |
| 568,754 | 4/1945 | England. |
| 722,351 | 1/1955 | England. |

OSCAR R. VERTIZ, Primary Examiner

J. COOPER, Assistant Examiner